United States Patent [19]
Galerne

[11] 3,984,627
[45] Oct. 5, 1976

[54] METHOD AND APPARATUS FOR EXAMINING THE INTERIOR OF A BORE HOLE AND/OR CAISSON OR THE LIKE

[76] Inventor: Andre Galerne, 264 Fordham Place, City Island, N.Y. 10464

[22] Filed: Apr. 18, 1974

[21] Appl. No.: 462,045

[52] U.S. Cl. .......................... 178/6.8; 178/DIG. 1; 33/304
[51] Int. Cl.² .......................................... H04N 7/02
[58] Field of Search ............. 128/4, 6; 178/DIG. 1, 178/6.8, DIG. 36, DIG. 40, DIG. 21; 33/304, 318, 302, 334, 348; 324/1; 356/241; 175/45; 73/151

[56] References Cited
UNITED STATES PATENTS

| | | | |
|---|---|---|---|
| 2,304,045 | 12/1942 | Anderson | 178/DIG. 1 |
| 2,334,475 | 11/1943 | Claudet | 178/DIG. 1 |
| 2,849,530 | 8/1958 | Fleet | 178/DIG. 1 |
| 3,168,909 | 2/1965 | Zurbrigen | 178/DIG. 1 |
| 3,753,296 | 8/1973 | Van Steenwyk | 33/304 |
| 3,780,220 | 12/1973 | Fugitt | 178/6.8 |
| 3,784,740 | 1/1974 | Copland | 178/6.8 |
| 3,885,091 | 5/1975 | Fish et al. | 178/DIG. 1 |

Primary Examiner—Robert L. Griffin
Assistant Examiner—Michael A. Masinick
Attorney, Agent, or Firm—Roberts & Cohen

[57] ABSTRACT

An apparatus for examining the interior of a bore hole and/or caisson. The apparatus includes a gyroscope arrangement for determining true azimuth reference and slant angle and slant angle azimuth direction relative to the reference. A television camera including a lighting section is fixed relative to the gyroscope package by a cage which is adapted for slidingly engaging the interior of the bore hole and/or caisson so that the gyroscope package can make effective determinations relative to the same in order to enable establishing the location of the television camera. A remote control is provided for controlling the lowering of the cage into the bore hole and/or caisson and for controlling the television camera as well as the lighting arrangement therefor. A television monitor is employed which is connected to the camera for displaying scenes of the interior as the gyroscope and camera arrangement is lowered through the bore hole and/or caisson. A device is provided for supplying clear or clarified water into the bore hole and/or caisson to maintain a hydraulic head therein and to facilitate the examining of the interior.

10 Claims, 7 Drawing Figures

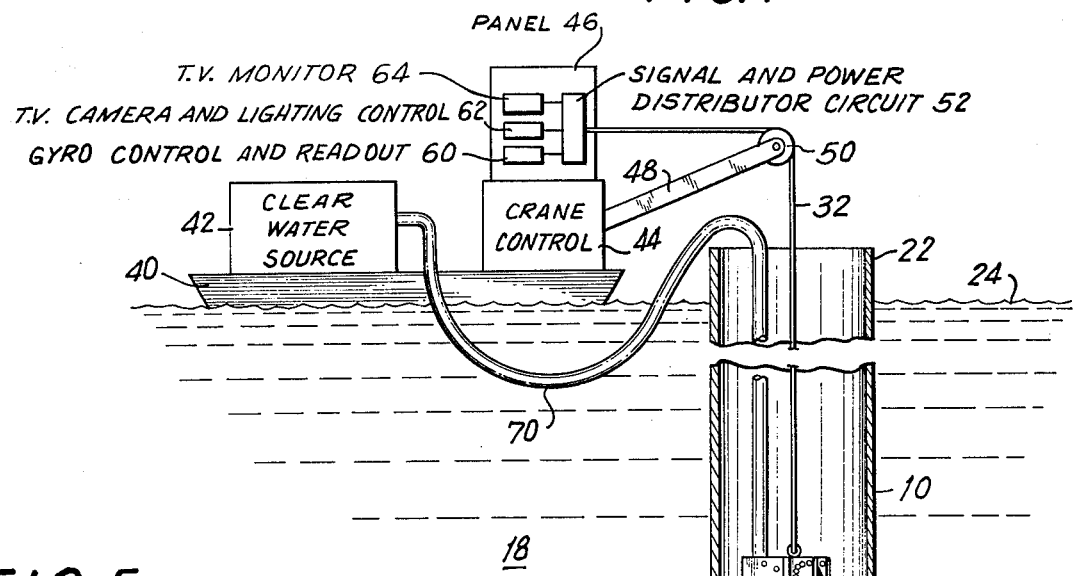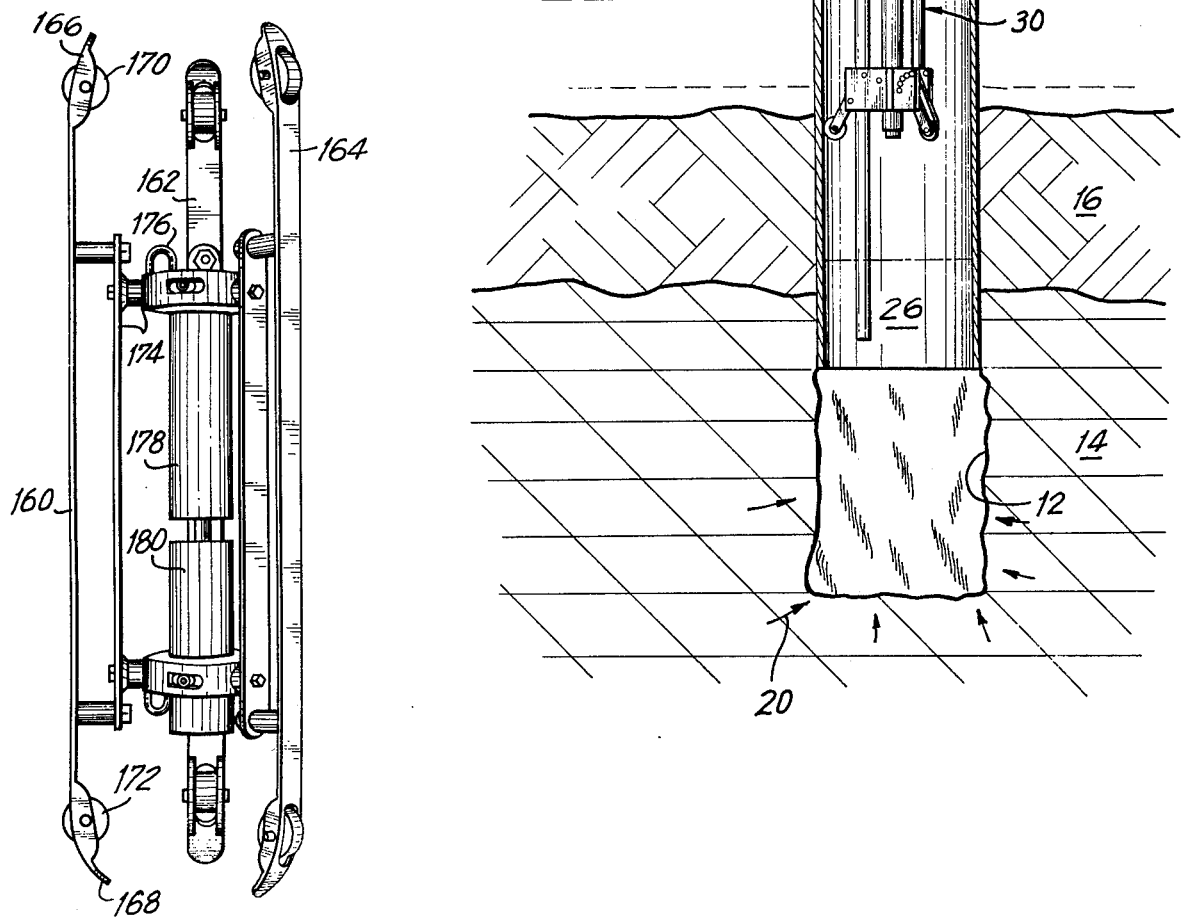

METHOD AND APPARATUS FOR EXAMINING THE INTERIOR OF A BORE HOLE AND/OR CAISSON OR THE LIKE

FIELD OF INVENTION

This invention relates to devices and methods for examining the interiors of bore holes and/or caissons or the like.

BACKGROUND

The use of the gyroscopes for purposes of surveying bore holes survey is known and has been employed for offshore and inland deep wells and open pits. Apparatus for this purpose is known, for example, to be manufactured by Humphrey Inc. of Santiago, California and is described in their Bulletin FG 5-1270 entitled "Surveyor Bore Hole Directional Systems". It is also known that underwater television cameras have been manufactured for the purpose of exploring otherwise inexcessible places. Such equipment is manufactured, for example, by IBAK Helmut Hunger of Kiel, Germany. However, the combination of these two types of apparatus to provide the advantages of the invention as discussed hereinunder has not yet been effected, as a consequence of which an important tool for the examination of the interiors of bore holes and/or caissons has not yet been realized.

SUMMARY OF INVENTION

It is an object of the invention to provide improved devices and techniques for the examination of the interiors of bore holes and/or caissons and the like.

Yet another object of the invention is to provide improved techniques for examining the interiors of casissons and bore holes in bedrock while preventing leakage through and damage to the bedrock while, at the same time, facilitating the examination of the interior of the caisson which might otherwise be obscured by the presence of muddy water.

Still further objects of the invention include providing improved means and methods for examining for cracks in caissons, for examining the seals of caissons to associated bedrock and for examining the condition of bedrock with respect to fractures, cracks and the like.

Still another object of the invention is to provide an improved apparatus and method for examining the geological characteristics of substrates inclusive of but not limited to faults therein as well as rock types and the like.

Yet another object of the invention is to provide improved means for the measuring of dip and strike characteristics of bedrock as may be occasioned by two faults coming together.

To achieve the above and other objects of the invention, there is provided an apparatus for examining the interior of a bore hole and/or caisson, which apparatus comprises gyroscope means for determining a true azimuth reference and slant angle and slant angle azimuth direction relative to this reference, the apparatus further including television camera means provided with lighting means and adapted for lighting and scanning the interior. A cage means is employed for fixedly supporting the gyroscope means and television camera means relative to each other so that the measurements taken from the gyroscope means can be used to precisely locate the television camera means. The cage means moreover provides for slidingly and snugly engaging the interior of the bore hole and/or caisson so that the gyroscope means can make effective determinations relative thereto.

In addition to the aforesaid, a remote control means is provided for controlling the lowering of the cage means into the bore hole and/or caisson and for controlling the television camera means. A television monitor is provided which is coupled to the camera means for displaying scenes of the interior as observed through the camera means.

According to a feature of the invention, a means may be provided for supplying clear or clarified water into the bore hole and/or caisson to maintain a hydraulic head therein and to facilitate the examination of the interior.

According to one embodiment of the invention, the camera means and gyroscope means can be mounted in side-by-side relationship. According to another embodiment of the invention, they may be mounted in end-to-end relationship.

The cage means may be of the type including spaced parallel spiders each including pivotal supports, triangularly arranged and having wheels mounted thereon and adapted to engage the aforesaid interior at equally spaced positions. A spring may be employed for engaging a support to urge the associated wheel yieldably against the interior.

According to another embodiment, the cage may consist of three parallel skids positioned at the apices of an imaginary equilateral triangle, each skid including upper and lower extremities of ski-tip form with wheels being mounted on said extremities.

The above and other objects of the invention will be apparent from the following detailed description of the invention.

BRIEF DESCRIPTION OF DRAWING

The invention is illustrated in the accompanying drawing in which:

FIG. 1 is a diagrammatic illustration of an embodiment of the invention in association with the environment thereof;

FIG. 5 illustrates a further embodiment of the invention in the form of a cage arrangement in which a gyroscope and television camera package can be mounted;

DETAILED DESCRIPTION

Figure 2:
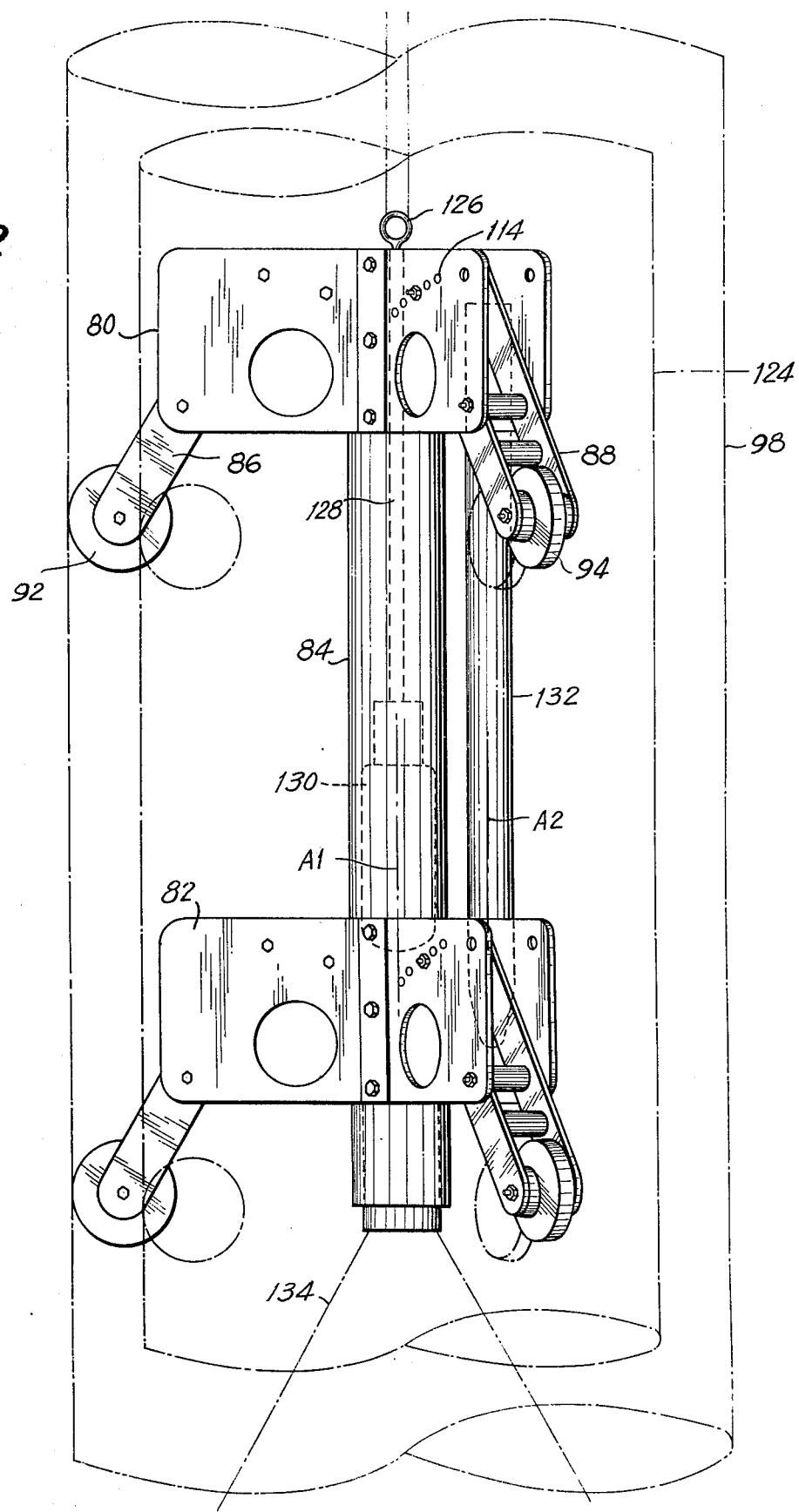
FIG. 2 is a side view of an apparatus incorporating a gyroscope and television camera arrangement in accordance with one embodiment of the invention.

In FIG. 1 is illustrated a caisson 10 installed in a bore hole 12 formed in bedrock 14 which is covered by a layer of silt 16 located at the bottom of a body of water 18 which forms a hydraulic head tending to urge fluid into the bore hole 12 as indicated by the various arrows 20.

The head 22 of the caisson extends above the surface 24 of the body of water 18 but the interior of the caisson 10 as well as that of the bore hole 12 is concealed from view and is not readily accessible. It is possible that the seepage of water through the bedrock 14 or otherwise into the interior of the caisson 10 may form an accumulation of muddy water such as indicated at 26 which may further obscure and prevent examination of at least a part of the interior of the caisson as well as the interior of the aforesaid bore hole.

In accordance with the invention, a package indicated generally at 30 is lowered into the interior of the caisson 10 by means of a cable or cables indicated at 32 constituting a flexible means to lower the package into the caisson while at the same time transmitting electrical power and/or signals to the package 30 and retrieving information in the form of electrical signals therefrom.

Illustrated by way of example and in diagrammatic form is a barge or platform 40 resting on the surface of the body of water 18, this platform or barge 40 including a clear water source 42, a crane control 44 and a panel 46. An arm 48 extends from the crane control and includes a pulley 50 at the free end thereof over which the cable or cables 32 pass to the package 30. The details of the package 30 will be examined hereinafter.

The panel 46 includes a general signal and power distributor circuit 52 by means of which signals are transmitted via cables 32 to the package 30 and which circuit furthermore operates to receive and distribute signals which are transmitted from the package 30 as will be described in greater detail hereinafter.

Signals are exchanged by circuit 52 with a gyro control and readout circuit 60, a television camera lighting and positioning control 62 and a television monitor 64, the details of which are known and the functions of which will become apparent hereinafter.

The clear water source 42 is connected via a hose 70 through the open mouth at the top of caisson 10 to the bottom of the same to supply clear or clarified water into the latter in order to facilitate examination of the interior of the caisson 10. More particularly, the supply of clarified water into the caisson 10 will serve to displace and/or dilute the muddy water 26 in order that the package 30 may move down to the very bottom of the bore hole 12 without having the view of the camera obscured. In addition, the clarified water plays a very important role in providing a hydraulic head within the caisson 10 which can readily be made to equal the hydraulic head of the body of water 18 whereby damage to the bedrock 14 may be avoided and whereby seepage of water through the bedrock into the bore hole may also be avoided. The supply of clarified water into the caisson 10 thereby represents an important feature of the invention although it will be understood that the use of this clarified water need not be necessary in cases where the environmental conditions of the caisson or other such tubular structure do not include water or substantial hydraulic heads.

Figure 3:
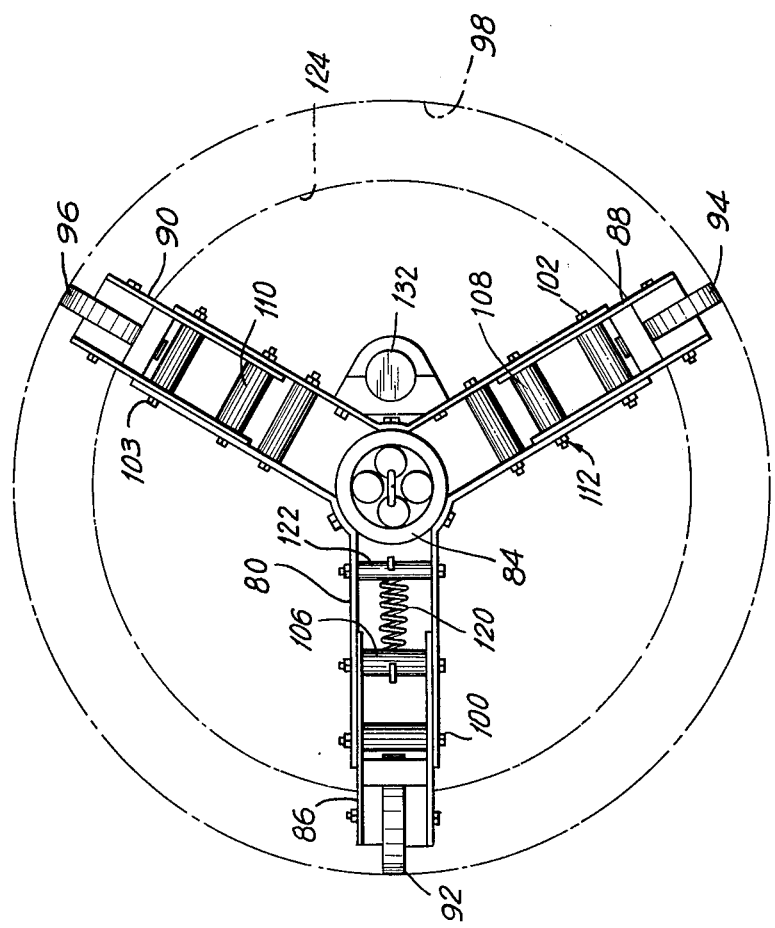
FIG. 3 is a top view of the apparatus illustrated in FIG. 2.

FIGS. 2 and 3 illustrate one package design which can be employed in accordance with the invention. More particularly, the apparatus illustrated in FIGS. 2 and 3 comprise spiders 80 and 82 arranged in spaced and parallel alignment. These spiders are mounted on a cylindrical tube 84 which serves to rigidly hold the spiders 80 and 82 in position.

Each of the spiders includes three supports 86, 88 and 90, these supports being pivotally mounted on the associated spiders and being furthermore triangularly arranged to carry wheels 92, 94 and 96 in position to engage the interior of the associated caisson indicated, for example, at 98 at the apices of an imaginary equilateral triangle inscribed in said interior 98.

The supports 86, 88 and 90 are pivoted to the associated spider by pivots 100, 102 and 103. The innermost extremities of the supports include rods 106, 108 and 110. In the case of rods 108 and 110, these may be fixed in position by nuts and bolts indicated generally at 112 selectively extended.

On the other hand, the rod 106 of the support 86 is engaged by a spring 120 connected to a fixed rod 122 mounted on the spider 80. This provides that the wheel 92 is spring loaded or resiliently urged outwardly against the interior 98 so that the package fits securely in position within the associated caisson which is to be examined while, at the same time, being slidingly displaceable through the latter.

At 124 is indicated an interior of another caisson through which the package may be slidingly lowered and which is of such a diameter as would occasion the retraction of the arms 88 and 90 in the manner indicated hereinabove with respect to the arcuate arrangement of holes 114.

Also indicated in FIGS. 2 and 3 is a hook or eye 126 by means of which attachment can be made to the package by a flexible cable or the like. A cable 128 is futhermore indicated, this including input and output lines directed to the transmitting of power and control signals to the gyroscope arrangement and television camera arrangement embodied in the apparatus of FIGS. 2 and 3. Still further indicated is the television camera 130 and the gyroscope arrangement 132 while at 134 is indicated the field of examination of the television camera lens. As will become apparent hereinafter, the camera lens need not be fixed but can be a pan and scan arrangement whereby a more flexible examination of the interior of the bore hole and/or caisson is permitted.

Figure 4:
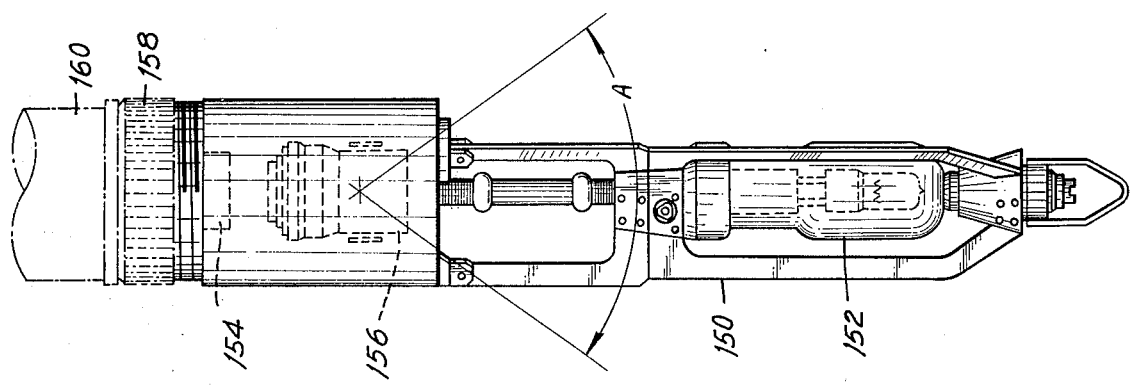
FIG. 4 is a side-view of the major portion of a camera and lighting arrangement according to the prior art which can be employed in the apparatus of FIGS. 2 and 3 as well as in various other embodiments of the present invention.

In FIG. 4 is indicated a television camera arrangement inclusive of a source of light as is available in the prior art. Herein is indicated a frame 150 within which is mounted a lamp 152. A vidicon is indicated at 154 and its lens is indicated at 156. The television camera is indicated generally at 158 with the remote control apparatus as well as couplings being generally indicated at 160. The camera will be further discussed hereinafter but it is to be noted that the illustrated camera is available commercially and may be, for example, one supplied by the IBAK HELMUT HUNGER CO. of Kiel, Germany.

A further cage arrangement or package of the invention is illustrated in FIG. 5 where appears in triangular relationship at the apices of an imaginary triangle, three skids 160, 162 and 164. Each of these skids has an upper extremity 166 and a lower extremity 168, both being of ski-tip form. In each of these extremities is mounted a wheel 170 or 172, these wheels being of such a diameter as to extend radially outwards of the associated skid to provide for slidable engagement with the interior of the caisson which is to undergo examination.

The skids 160, 162 and 164 are connected together by a framework indicated generally at 174 on which are mounted one or more loops 176 by means of which attachment to a cable is enabled. In addition, the gyro may be mounted as indicated generally at 178 with the camera being mounted as indicated at 180. Thus, the camera and gyroscope arrangement may be mounted either in end-to-end relationship or in side-by-side relationship as has been described hereinabove. It is to be noted that both the gyroscope arrangement and the television camera may be mounted together upon the same skid arrangement or, alternatively, two skid arrangements may be provided in end-to-end relationship one being provided for the television camera and the other being provided for the gyroscope arrangement. In this event, the skid arrangements must be fixed together so that the gyroscope arrangement is fixed relatively to the television camera so that information gained from the gyroscope arrangement is valid with respect to the television camera.

The above type of apparatus is intended to permit a precision inspection of bore holes, caissons, wells and any form of shaft within, for example, 60° of a vertical line. The inspection is permitted by the integration of a miniature waterproof closed circuit television camera as is available from the prior art, and, preferably, two directional gyroscopes providing a true azimuth reference at slant angle and slant azimuth direction of the television camera.

Generally, the complete system of the invention includes a closed circuit television camera, a lighting system, a television and lighting control unit, a television monitor, a dual gyroscope probe, a centeralizing guide and cables connected thereto. In operation, absolute orientation of the camera and hole direction are provided by use of the above.

As to the dual gyroscope probe, this is employed for extra precision. One gyroscope provides the true azimuth reference (and is uncaged in a known starting position). The other gyroscope is the slant angle direction gyroscope. The slant reference directional gyroscope provides slant angle output and azimuth direction of slant angle. Its inner gimbal is continuously erected to maintain the spin axis horizontal. The outer gimbal is continuously precessed to aim the spin axis in the aximuth direction of slant angle heading. Thus the inner gimbal angle is acutal slant angle and the outer gimbal position is the slant angle heading. This is differentially related to the azimuth directional gyroscope output and thus direct readings are given on an absolute slant angle and slant angle azimuth heading.

Figure 6:
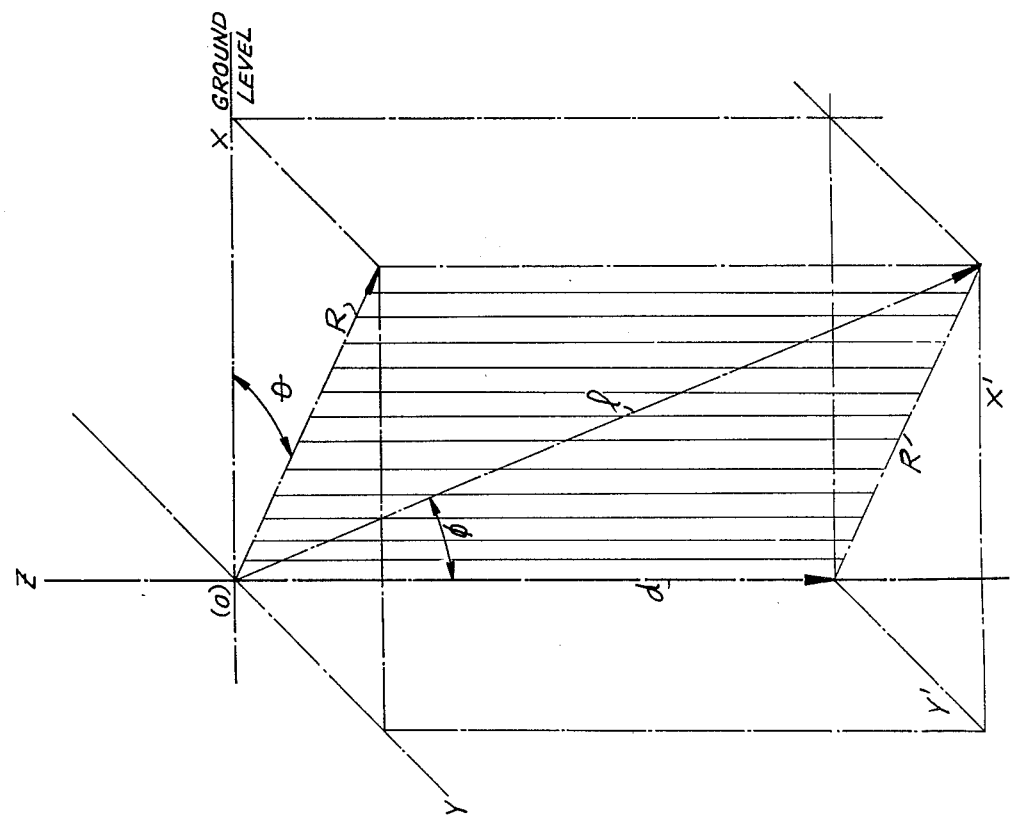
FIG. 6 is a diagrammatic illustration of the information taken from the gyroscope.

In the generalized illustration given in FIG. 6, phase sensitive synchro or potentiometer readings are available for $\Theta$ which gives slant angle direction. Phase sensitive synchro or potentimeter readings are also available for $\Phi$ which is the slant angle. The cable length is readily determined from the use of an idler counter (not shown) or some other means of measuring deployed cable length.

Figure 7:
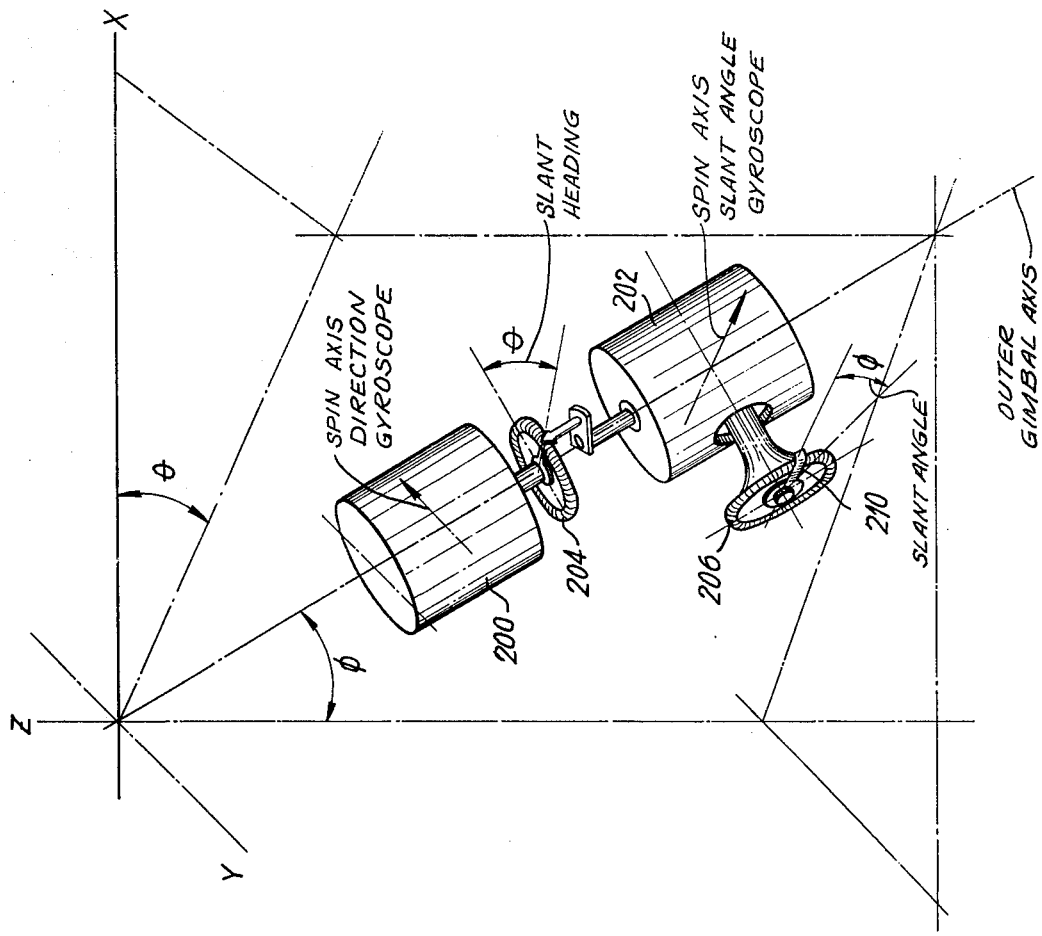
FIG. 7 is a diagrammatic illustration of a gyroscope information source known in accordance with the prior art but employed in a novel combination in accordance with the invention.

With reference next to FIG. 7 which illustrates the use of two gyroscopes for the reasons given above, it is seen that the gyroscopes indicated generally at 200 and 202 are provided with miniature synchros or potentimeters 204 and 206. If components 204 and 206 are potentiometers, associated with the potentimeter 204 is a wiper 208 and associated with the potentiometer 206 is wiper 210.

The direction of gyroscope spin axis always stays in line with the initial reference position. The outer gimbal position is represented by the synchro or potentimeter output. The spin axis of the slant angle gyroscope is always directed into alignment with the slant angle direction by its torquer and outer gimbal mercury switch sensing system (not shown). Its outer gimbal position represented by the synchro or potentimeter output yields the slant angle direction $\Theta$. The output from component 204 is proportional to the slant direction or slant angle plane direction.

The output of component 206 is proportional to slant angle $\Phi$ measured from the vertical. The spin axis from the slant axis gyroscope is maintained in a horizontal plane at all times by its mercury switch and torquer system (not shown). Since the outer gimbal always faces the slant angle direction, the difference between the outer gimbal axis direction and vertical is represented.

It can be seen that with continuous read out available on the angles $\Theta$ and $\Phi$ and for selected increments $\Delta l$, the XYZ hole coordinates can be found as follows:

$R = l \sin \Phi$
$\Delta X = R \cos \Theta = \Delta l \sin \Phi \cos \Theta$
$\Delta Y = R \sin \Theta = \Delta l \sin \Phi \sin \Theta$
$\Delta Z = - - - - - \Delta l \cos \Phi$ Thus for regular intervals of cable travel, $\Delta X$, $\Delta Y$ and $\Delta Z$ may be calculated. By summing these to any point down the hole, the X, Y and Z coordinates are found.

As indicated above, the directional gyro systems are commercially available in the form of ruggidized directional gyroscopes with a drift rate of below 10° per hour. They provide electrical remote caging and uncaging for quick zeroing and alignment. Also provided is a digital readout of azimuth slant angle and slant angle bearing. Also there may be employed electric pendulums to measure slant angle and slant angle bearings reference to a gyroscope heading.

As to the camera power supply and control unit, both of which are commercially avaivable, the power supply and control unit is a complete self-contained unit with full capability for remotely energizing and controlling the camera focus and lamp control. Such a unit consists of a stepdown transformer, full wave rectifier, air filter, constant voltage regulator and a constant current regulator. The constant regulator is utilized between the output of the power supply and the remote camera in order to compensate for different interconnecting cable lengths.

As to the television monitor, this is also commerically available in the form of a standard industrial unit capable of operation from a line containing composite video and synchronization signals while providing a video output signal suitable for video recording.

For camera pan and tilting control, there are available commercially units for providing two axis control of the television camera and light. A panning movement is provided through a 360° arc about a vertical axis while a tilt control provides a 190° arc through an arcuate arrangement of points about a horizontal axis. The drive motors therefor are low speed reversible synchronous type motors which drive through low back-lash worm gear trains which provide braking when the drive motors are de-energized. The position of each worm gear is transmitted to the camera control unit 62, as the outputs of two synchros or potentiometers. The outputs are converted and displayed on unit 62 so that the camera/gyro can be re-aligned within the borehole, caisson or whatever other type of opening is being dealt with. The position readout circuits consist of standard commercially available synchro repeaters, power supply and readout display.

As to the lighting sytem, the lighting used is a function of the observations to be made and the ambient light levels which may be present.

As to the closed circuit television camera, this is a self-contained transistorized unit commerically available and consisting of a water-tight cylindrical camera housing which contains an optical system, a vidicon tube and associated circuitry for camera control and focusing as indicated above with reference to FIG. 4. The focusing system consists of a lens and a focus mechanism assembly. The focusing mechanism assembly consists of a DC drive motor and a driive shaft with a clutch mechanism that protects the motor when the assembly engages the forward and rear stops which are provided. The vidicon and socket are mounted in the forward ends of the focusing mechanism assembly. Both move with the focusing assembly to accomplish camera focusing.

The camera provides a high resolution picture down to light levels as low as 0.1 foot candles at the vidicon while providing automatic target control over a dynamic light range of greater than 10,000:1.

The camera preferably provides a 525 line double interlaced scanning (U.S.(EIA)) standard with a composite video signal. Crystal control synchronizing frequencies of 15.75 KHz horizontal and 60 Hz vertical are internally supplied by the camera.

From what has been stated above, it will now be seen that the invention provides an apparatus for examining the interior of a bore hole and/or caisson. This apparatus comprises a gyroscope means for determining true azimuth reference and slant angle and slant azimuth direction relative to said reference. The apparatus furthermore includes a television camera means which in turn includes lighting means and is adapted for lighting and scanning the aforesaid interior. Furthermore, there is incorporated a cage means fixedly supporting said gyroscope means and television camera means relative to each other and adapted for slidingly and snugly engaging the interior of the aforesaid hole and/or caisson so that said gyroscope means can make effective and meaningful determinations relative thereto. A remote control means is provided for controlling the lowering of said cage means into the aforesaid bore hole and/or caisson and for controlling said television camera means. A television monitoring means is coupled to the aforesaid camera means for displaying scenes of said interior as observed through said camera means.

According to the invention, a method is provided in accordance with which a gyroscope means is arranged on a television camera to form a package which is lowered through the interior of a bore hole and/or caisson with the gyroscope means determining for the camera a true azimuth reference and slant angles and slant azimuth direction relative to said reference. The method further comprises remotely receiving pictures of the interior as observed through the camera and coordinating the same with the depth and angular disposition of the camera.

According to a feature of the invention, clarified or clear water is poured into the bore hole and/or caisson to form a hydraulic head therein and to facilitate examining the interior of the same.

There will now be obvious to those skilled in the art many modifications and variations of the methods and apparatus set forth hereinabove. These modifications and variations will not depart from the scope of the invention if defined by the following claims.

What is claimed is:

1. Apparatus for examining the interior of a bore hole and/or caisson having an axis, said apparatus comprising gyroscope means having a sensing axis and determining a true azimuth reference and slant angle and slant azimuth direction relative to said reference, television camera means including lighting means and adapted for lighting and scanning said interior, cage means fixedly supporting said gyroscope means and television camera means relative to each other, said cage means including means for slidingly and snugly engaging the interior of said hole and/or caisson so that said gyroscope means can make effective determinations relative thereto while said television camera means scans the interior of the bore hole and/or caisson, said cage means maintaining the sensing axis of the gyroscope means parallel to the axis of said bore hole and/or caisson, remote control means for controlling the lowering of said cage means into said bore hole and/or caisson and for controlling said television camera means, and television monitoring means coupled to said camera means for displaying scenes of said interior as observed through said camera means.

2. Apparatus as claimed in claim 1 comprising means for supplying clear water into said bore hole and/or caisson to maintain a hydraulic head therein and to facilitate the examining of said interior.

3. Apparatus as claimed in claim 1 wherein said camera means and gyroscope means are mounted in side-by-side relationship in said cage means.

4. Apparatus as claimed in claim 1 wherein said camera means and gyroscope means are mounted in end-to-end relationship in said cage means.

5. Apparatus as claimed in claim 1 wherein said cage means includes three parallel skids positioned at the apices of an imaginary equilateral triangle and each including upper and lower extremities of ski-tip form, and wheels mounted on said extremities.

6. Apparatus as claimed in claim 1 wherein said camera means includes a displaceable lens system controllable through said remote control means.

7. Apparatus as claimed in claim 1 wherein said means for engaging the interior of the hole and/or caisson includes spaced parallel spiders each including pivotal supports triangularly arranged, wheels mounted on said supports and adapted to engage said interior at equally spaced positions, and spring means engaging at least one of the supports to urge the associated wheels yieldably against said interior; said cage means further including means to hold said spiders in spaced parallel relation and to hold said gyroscope means and camera means.

8. Apparatus as claimed in claim 7 wherein said cage means includes means for adjustably mounting selected of said supports to account for different internal diameters of said bore hole and/or caisson.

9. A method of examining the interior of a bore hole and/or caisson, said method comprising arranging a gyroscope on a television camera to form a package which is lowered through said interior, operating the gyroscope to determine for said camera a true azimuth reference and slant angles and slant azimuth direction relative to said reference, guiding the package of the gyroscope and the camera through the interior of the bore hole and/or caisson, determining the depth of the package while it is being lowered into said interior, and remotely receiving pictures of the interior as observed through said camera and coordinating the same with the depth and angular disposition of said camera.

10. A method as claimed in claim 9 comprising pouring clarified water into the bore hole and/or caisson to form a hydraulic head therein and to facilitate examining said interior.

* * * * *